US005079489A

United States Patent [19]

Ishii

[11] Patent Number: 5,079,489

[45] Date of Patent: Jan. 7, 1992

[54] METHOD OF OPERATING PRESS MACHINE AND SERVO CONTROLLER THEREFOR

[76] Inventor: Mitoshi Ishii, 1-3, Higashiohmichi, 2-chome, Ohita-shi, Ohita, Japan

[21] Appl. No.: 627,459

[22] Filed: Dec. 14, 1990

Related U.S. Application Data

[60] Division of Ser. No. 542,556, Jun. 25, 1990, which is a continuation-in-part of Ser. No. 245,476, Aug. 24, 1988.

[30] Foreign Application Priority Data

Dec. 29, 1986 [JP] Japan ............................ 61-310994

[51] Int. Cl.[5] ............................ G06F 15/46

[52] U.S. Cl. ............................ 318/560; 318/567; 192/131 R; 72/405

[58] Field of Search ............................ 318/560-646; 72/405; 192/131 R, 355; 425/146; 364/475, 474

[56] References Cited

U.S. PATENT DOCUMENTS 3,602,947 9/1971 Morgan ............................ 425/146
3,939,314 2/1976 Loeser ............................ 200/61.42
4,063,627 12/1977 Wright ............................ 192/131 R
4,280,182 7/1981 Mickowski ............................ 318/567 X
4,348,943 9/1982 Bouyoucos ............................ 91/355
4,743,900 5/1988 Röhrle ............................ 318/562 X
4,929,276 5/1990 Chun et al. ............................ 83/552 X
4,987,765 1/1991 Nishimura et al. ............................ 72/405

*Primary Examiner*—Paul Ip
*Attorney, Agent, or Firm*—Armstrong, Nikaido, Marmelstein, Kubovcik & Murray

[57] ABSTRACT

In a method of operating a press machine having a servomotor (20) and a servo controller therefor, the tool stays substantially still immediately after the completion of working a workpiece for a period of from 0.05 to 2 seconds and also the speed of the tool applying an impact to the workpiece for working is decelerated immediately before the tool strikes against the workpiece in order to reduce the noise generated when the impact is applied. The speed and positional locus of the ram (36) are set for each step using respective setting switches provided on a panel. The servomotor (20) is program-controlled according to the data input through the respective setting switches.

6 Claims, 11 Drawing Sheets

METHOD OF OPERATING PRESS MACHINE AND SERVO CONTROLLER THEREFOR

This is a division of application Ser. No. 542,556 filed June 25, 1990 which is a continuation-in-part of application Ser. No. 245,476, filed on Aug. 24, 1988.

The present invention relates to a method of operating a press machine which prevents a workpiece from being damaged and also enables a noise reduction during an operation of the press machine, and a servo controller therefor. More particularly, the present invention is directed to a method of operating a press machine wherein a servomotor for driving the press machine is program-controlled to reduce the speed of a ram during an operation of the press machine, and a servo controller therefor.

BACKGROUND ART

Various types of press machine are selected and used in accordance with the kinds of plastic working. The press machines may be roughly divided into two types, that is, a mechanical press that employs mechanical force as a drive source for driving the same and a hydraulic press that employs hydraulic pressure such as the pressure of oil or water.

Mechanical presses have high working speed and high productivity. Hydraulic presses, however, have the following superior features: the pressure application period can be increased; the pressure can be made to last longer; it is easy to adjust the level of pressure; and it can generate high pressure. As power transmission mechanisms for mechanical presses, mechanisms such as crank-, knuckle joint-, cam-, screw-, rack- and link-type mechanisms are known. Mechanical presses without flywheel have screw-, rack- or link-type power transmission mechanisms and many of them are small in size. The capacity to store energy is small, the stroke is determined in accordance with the resistance of a workpiece, and the bottom dead point is unstable.

Lead frames for ICs are produced by blanking a metallic sheet material. Press machines are used to generate pressure for this blanking. As press machines for this purpose, hydraulic presses are used in most cases. This is because it is necessary to detect a possible error of the work position by a sensor such as an inspection pin and suspend momentarily the press machine in order to prevent generation of defective products due to, for example, offset position of the work inside the blanking die. In other words, hydraulic presses are superior in controlling the performance such as stopping and starting, and therefore used for the above-described purpose.

There are several problems in pressing or in blanking a metallic sheet material.

First, there occurs breakage or damage to the workpiece when the tool leaves from the workpiece. This is because since the moment the tool impacts upon the workpiece it momentarily sticks upon the workpiece because of the momentum vacuum between the tool and the workpiece. Thus, when the tool leaves from the workpiece immediately after the completion of working, it also pulls workpiece up. Therefore, if the workpiece is a small and thin product such as a lead frame of an integrated circuit, the tool inevitably damages the workpiece.

If the retrieval speed is reduced to avoid this problem, then the productivity is also lessened.

Another problem is a noise of the press machine.

Hydraulic presses generate a considerably unpleasant noise including a pumping noise generated in a hydraulic pump, intermittent high-pitched noise generated when the hydraulic pipe for press working expands, solenoid operating noise, etc. In a hydraulic press, even when it is not working, as long as the switch for the hydraulic pump is ON, electric power is consumed more than while it is in an operative state, and it is in an operative state, and it is uneconomical. Mechanical presses also generate a high level of noise including noise generated when the flywheel is rotating, gear transmission noise, noise generated when the clutch is engaged and disengaged, and mechanical frictional noise generated due to backlash.

Further, in both hydraulic and mechanical presses, when a tool strikes against a workpiece for plastic working, an extremely high impact noise is generated, and also when the cut workpiece is separated from the tool, a noise (also referred to as "stripping noise" in this specification) is again generated. Thus, press machines have heretofore been synonymous with main sources of generation of a high level of noise in factories. For this reason, how to reduce the unpleasant noises in both hydraulic and mechanical presses has been very important subject for work-site people.

In general, noise in the factories or the like makes people not only feel uncomfortable but also mentally fatigued. As a result, the incidence of workmen's accidents increase and the working efficiency lowers. In addition, a hearing difficulty may be caused. If a person is engaged for a long time in an operation where he is exposed to a considerable noise, such as a press working operation, there is a fear of that he may suffer from occupational bradyacusia. It is necessary to take some measures from the viewpoint of workmen's health. Under these circumstances, standards have been established by academic societies and laws relevant to the subject on the basis of three factors, that is, the center frequency and the exposure time per day, so that no hearing disorder is caused.

For example, the Industrial Sanitary Society of Japan established a permissible noise level in 1975. According to this standard, the exposure time per day is limited to 2 hours at 85 phons. To meet this standard, it is a conventional practice to surround a press machine b, for example, a noise reducing panel formed in the shape of a box or lower the speed of operation. However, if a press machine is covered by a box-shaped structure, the external size increases and the view of the factory and the operability are extremely impaired. In addition, the factory space is restrained accordingly.

SUMMARY OF THE INVENTION

The first feature of the invention is to provide the tool with a suspension speed such that the tool stays substantially still for a period of 0.05 to 2 seconds immediately after the tool impacted upon the workpiece. Due to this period, an air flows into a space between the tool and the workpiece to separate them smoothly and it prevents the workpiece from being broken or damaged. This period is extremely effective if the workpiece is a thin material such as a lead frame for an integrated circuit.

A second feature of the present invention resides in a method of operating a press machine designed to apply external force to a part or the whole of the surface of a workpiece to thereby cause plastic deformation therein, comprising an approaching step in which a tool for applying external force to the workpiece is moved at a set speed to approach the workpiece, a working step in which the speed of movement of the tool is reduced to, preferably, around 1.5 meter/second which is substantially lower than that in the approaching step to thereby cause plastic deformation in the workpiece without generating a high noise, and a separating step in which the tool is separated from the workpiece after completion of the working step.

A third feature of the present invention resides in a servo controller for a press machine having a frame, a servomotor provided on the frame, a power transmission mechanism for transmitting the rotational driving force of the servomotor, and a reciprocating motion conversion mechanism for converting power received from the power transmission mechanism into a reciprocating motion of a ram, the servo controller comprising a control and display panel comprised of a plurality of switches for determining a locus of motion of the ram by controlling the rotation of the servomotor, a servo control unit for controlling the motion of the servomotor, and a central processing unit for giving commands to the servo control unit on the basis of input command signals from the control and display panel.

If the above-described second feature of the present invention is applied to a conventional hydraulic press, the following problems arise. Since air pressure, oil pressure (air is generally mixed in the oil) or piping acts as a cushion, even if the working speed of the ram at the time when a metal sheet is worked is apparently lowered, working starts only after penetration into the workpiece of the tool attached to the distal end of the ram has progressed and pressure for working has been stored in the piping. Accordingly, the above-described air pressure, oil pressure and piping undesirably store energy and therefore the speed of the ram at the moment when the workpiece is worked is increased rather than reduced, which results in generation of a noise. Thus, this application is less effective.

Since the press machine according to the present invention employs a mechanical mechanism for transmitting pressing pressure, it has less cushioning as in the case of a hydraulic type (air is generally mixed in the liquid) press or an air type press. The present invention enables working to be carried out quietly and gently as if a sheet of iron were cut or pressed with tinman's shears. According to an experimental example in one embodiment described later, it is possible with the press of the present invention to reduce the noise to 65 phons or less in an operation of 40 strokes per minute simply by reducing the speed of rotation of the servomotor to about one half of the normal only in one momentary period during which noise was generated, whereas the noise generated in a conventional oil hydraulic press for manufacturing IC lead frames was 85 phons in the same operation, i.e., 40 strokes per minute.

Further, it is possible to reduce by a large extent the energy consumption as compared with the conventional oil hydraulic press. According to an experimental example in one embodiment described later, the motor of the conventional oil hydraulic press was operated 100% at 2.2 kW. In contrast to this, in the press machine of the present invention having the same capability, a servomotor of 0.5 kW was used 50% in time proportion and the amount of electric energy used was on the average about 1/10 of that in the case of the oil hydraulic press. In a comparison as to the noise level between the method of operating a press machine according to the present invention and a conventional mechanical press also, it was revealed that the noise was reduced by a large margin in substantially the same way as in the case of the above-described conventional oil hydraulic press. In a size comparison between the present invention and the conventional oil hydraulic press, it is possible to realize a press machine with a size substantially equal to that of the cylinder part of the conventional oil hydraulic press, yet the realized press machine had performance substantially equal to that of the latter. In other words, the press machine according to the present invention can be considerably reduced in size.

In the case where the ram of a press is designed to move through a certain stroke, the ram of the conventional mechanical press moves through the entire design stroke during working even if it is unnecessary for the ram to do for working. Therefore, when runaway occurs, it is extremely dangerous; therefore, it has heretofore been necessary to take a complete safety measure. Since the servo controller according to the present invention enables the ram to be instantaneously moved at full speed and also suspended, when, for example, an abnormality of a workpiece is detected by means of a detector installed inside the die, the ram can be suspended instantaneously within a short distance.

Since the travel of the ram is short and it does not move more than necessary as in the case of the conventional mechanical press, the press machine of the present invention can be used safely without a fear of the operator's finger entering the space between the tool attached to the distal end of the ram and the workpiece. Since there is no useless movement, the operating efficiency of the press machine is also improved. In addition, it is essential to oil the mechanism part of the mechanical press, and if the operator forgets to oil it, seizing may occur and it may become impossible to use the machine. Thus, the necessity of oiling has heretofore been a troublesome matter. There has been the inconvenience that the whole of the press machine may be sticky with oil.

In the press machine of the present invention of one embodiment, the mechanism part is formed in a totally-enclosed box filled with oil. Thus, it is possible to eliminate the troublesome oiling and the fear of seizing due to lack of oil and use the machine stably for a long period of time. Further, the largest merit resides in that the oil filled in the frame incorporating the power transmission mechanism enables a reduction in the mechanical noise. The present invention has the above-described features and aims at attaining the following subjects.

It is an object of the present invention to provide a method of operating a press machine which enables a non-damage working and reduces the noise generated during an operation of the press machine.

It is another object of the present invention to provide a mechanism for a press machine which enables a non-damage working and reduces the noise generated during an operation of the press machine.

It is still another object of the present invention to provide a servo controller which enables non-damage working and reduces the noise generated in a series of operations of a press machine.

It is a further object of the present invention to provide a servo controller for a press machine which is capable of program control so as to optimize a press operation.

BEST MODE FOR CARRYING OUT THE INVENTION

The present invention will be described hereinunder in more details with reference to the accompanying drawings.

Figure 1:
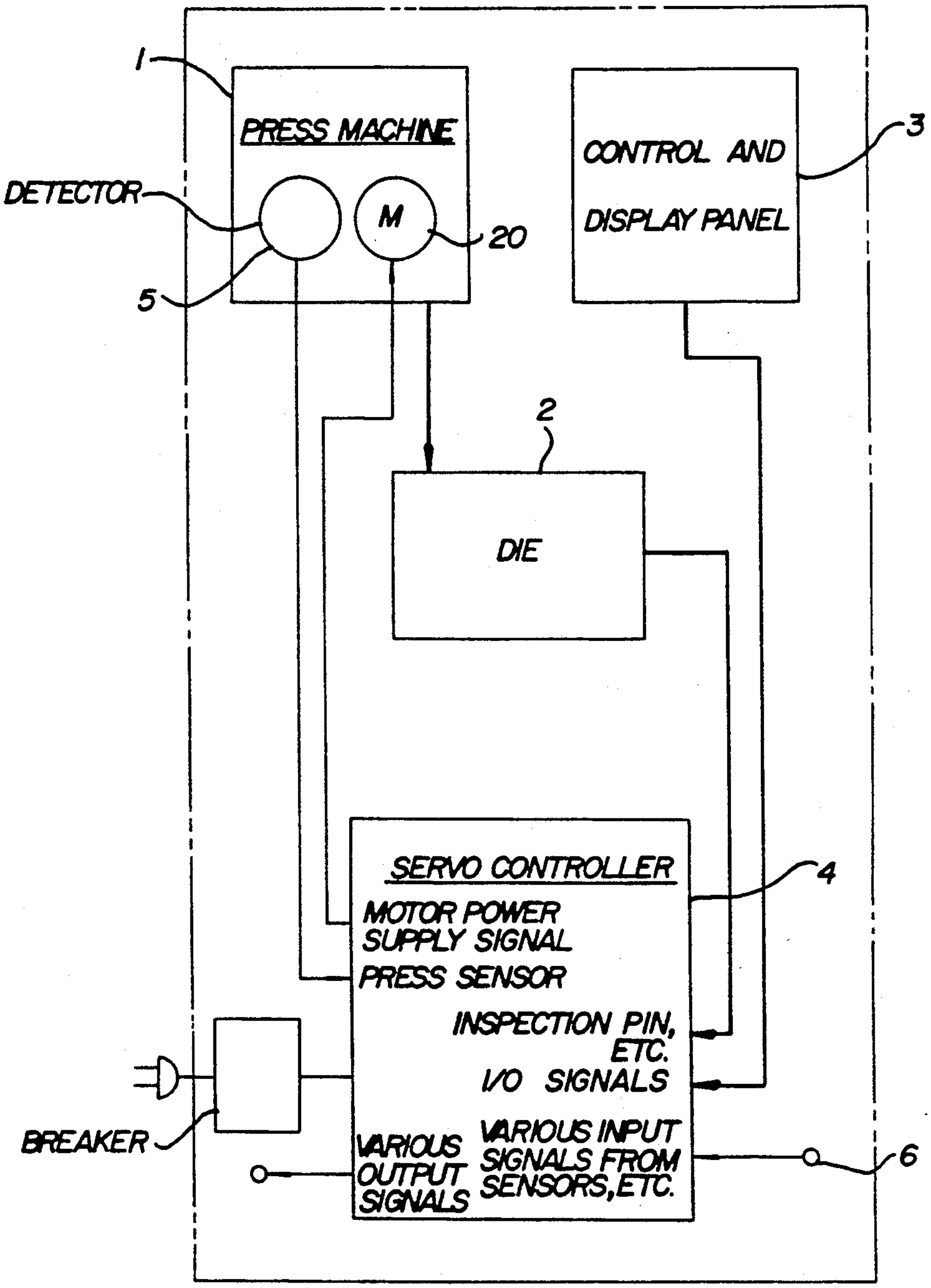
FIG. 1 is a functional block diagram showing a concept of the present invention.

FIG. 1 is a functional block diagram showing an outline of the method of operating a press machine and servo controller therefor according to the present invention. A press machine 1 is provided with a power transmission mechanism for converting the rotational force from a servomotor 20 into a reciprocating motion of a ram, as described later. A die 2 is provided to carry out a desired machining process such as cutting, blanking or bending. The structure and function of the die 2 are known and therefore detailed description thereof is omitted.

A control-and-display panel 3 is a device for inputting and displaying commands for a series of operations of the press machine 1 and data for display. A servo controller 4 controls and operates the servomotor 20 of the press machine 1 in response to commands given by the operator from the control-and-display panel 3. The servo controller 4 is also arranged to receive signals, for example, a signal from a ram position detector 5 attached to the press machine 1, input/output signals from a host computer or the like, a detected signal delivered from the inside of the die 2 and input signals 6 from various sensors and relays, and process these signals.

Figure 2:
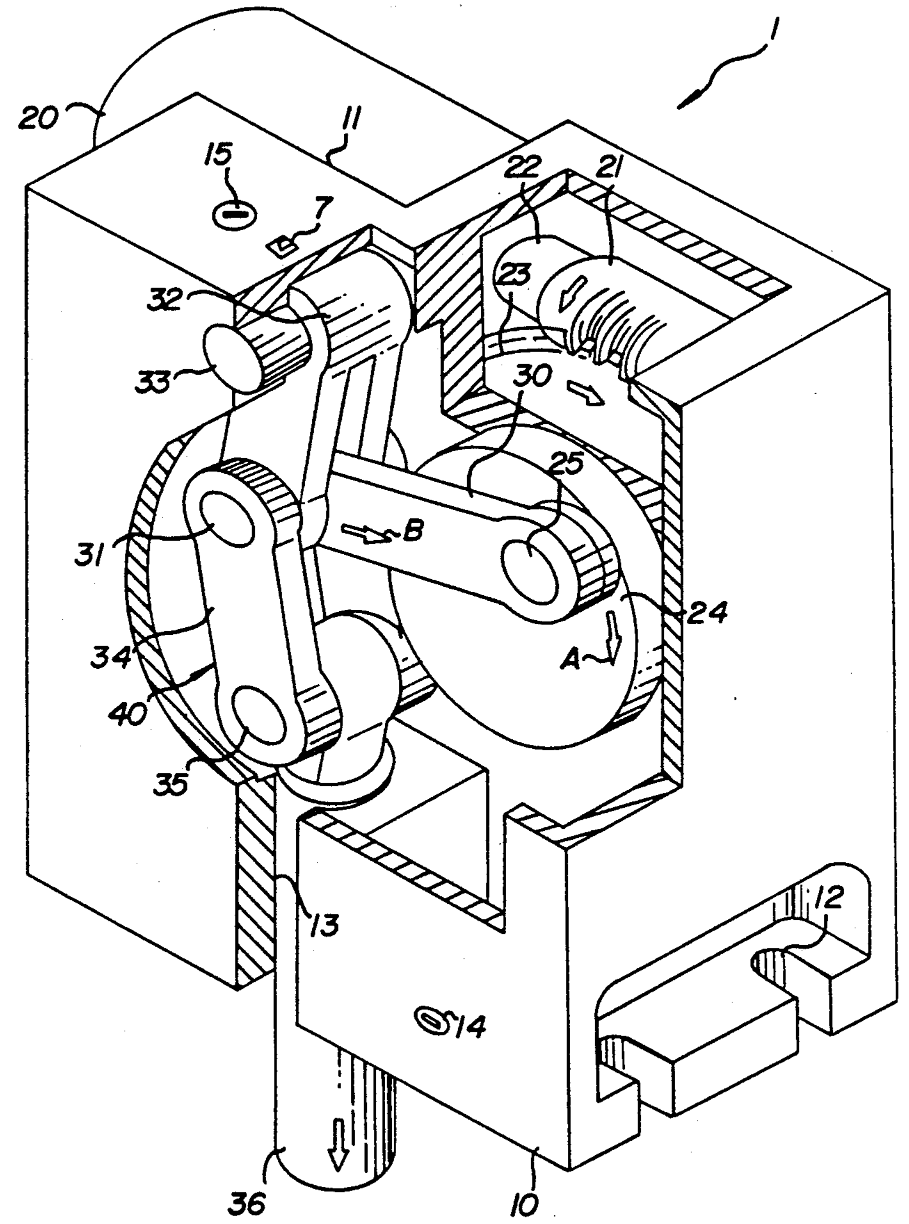
FIG. 2 is a partially-cutaway perspective view of a press machine 1 used in the present invention.

FIG. 2 shows the power transmission mechanism of the press machine 1 according to the present invention, the figure being a perspective view thereof in which the frame 10 is partially cut away. In this embodiment, the technical idea of the present invention is applied to a knuckle joint press. The frame 10 has a hollow box-shaped configuration. In this embodiment, the frame 10 is produced by machining an aluminum cast metal. This embodiment is a 1-5t press designed to blank lead frames of ICs, the press having a plane of about 200×200 mm and a length of about 300 mm. The frame 10 may be produced by welding steel plates. The frame 10 has a ram guide bore 13 through which a ram 36 (described later) projects and withdraws, a bore for receiving the output shaft of a servomotor 20, an assembly bore (not shown) for receiving and assembling a crankshaft 24 and the like inside the frame 10.

These receiving and assembly bores are provided with respective O-rings (not-shown) to prevent leakage of gear oil filled inside the frame 10. The side surface of the bottom of the frame 10 is provided with mounting grooves 12 which are defined by U-shaped notches. The mounting grooves 12 are provided to secure the frame 10 to a structure or the like by means of bolts when the press machine 1 is installed. An oil drain port 14 is provided in the frame 10 near the bottom thereof for draining the gear oil contained in the frame 10.

The oil drain port 14 is arranged such that, when the gear oil filling the inside the frame 10 is to be drained, a screw screwed in the oil drain port 14 is unscrewed to discharge the gear oil. The upper side of the frame 10 is provided with an oil filling port 15 for filling gear oil. The oil filling port 15 for filling gear oil into the frame 10 has a structure similar to that of the oil drain port 14.

Gear oil is filled into the inside space of the frame 10 for the purpose of absorbing noise generated from a speed reducing gear mechanism (described later) and a toggle mechanism 40 and of lubricating these mechanisms. It is even more preferable to select a gear oil with the frequency of generated noise being taken into consideration so that the employed gear oil has excellent frequency abating characteristics (in this embodiment a reduction of 8 phons was achieved by the effect of the gear oil alone). The servomotor 20 is secured to a cut portion 11 of the frame 10 by securing means such as bolts. The servomotor 20 is a motor capable of switching the directions of its revolution at a high frequency, i.e., forward and backward revolutions at a frequency of 100 to 500 times per minute.

One end of a worm shaft 22 is keyed to the output shaft (not shown) of the servomotor 20. The teeth of a worm 21 are meshed with the teeth of a worm wheel 23. The tooth shapes of the worm 21 and the worm wheel 23 are standard shapes ones. The worm 21 and the worm wheel 23 form, in combination, a speed reducing gear mechanism. A disk-shaped crankshaft 24 is keyed (not shown) to the shaft of the worm wheel 23.

A crank pin 25 is secured to the crankshaft 24 at a position which is a predetermined amount eccentric with respect to the center of the crankshaft 24. One end of a connection 30 is rotatably fitted onto the crank pin 25. The other end of the connection 30 is rotatably provided on a shaft 31 of a toggle device 40. One end of an upper arm 32 which is defined by two parallel links is pivotally provided on the shaft 31. The other end of the upper arm 32 is pivotally provided on a shaft 33.

Further, the shaft 31 is rotatably provided with one end of a lower arm 34 which is defined by two parallel links. The other end of the lower arm 34 is rotatably provided on a shaft 35. The shaft 35 is provided in parallel to the above-described shaft 31. The shaft 35 is pivotally provided with one end of the ram 36. A tool (not shown) for working is secured to the distal end of the ram 36 by known means.

Figure 3:
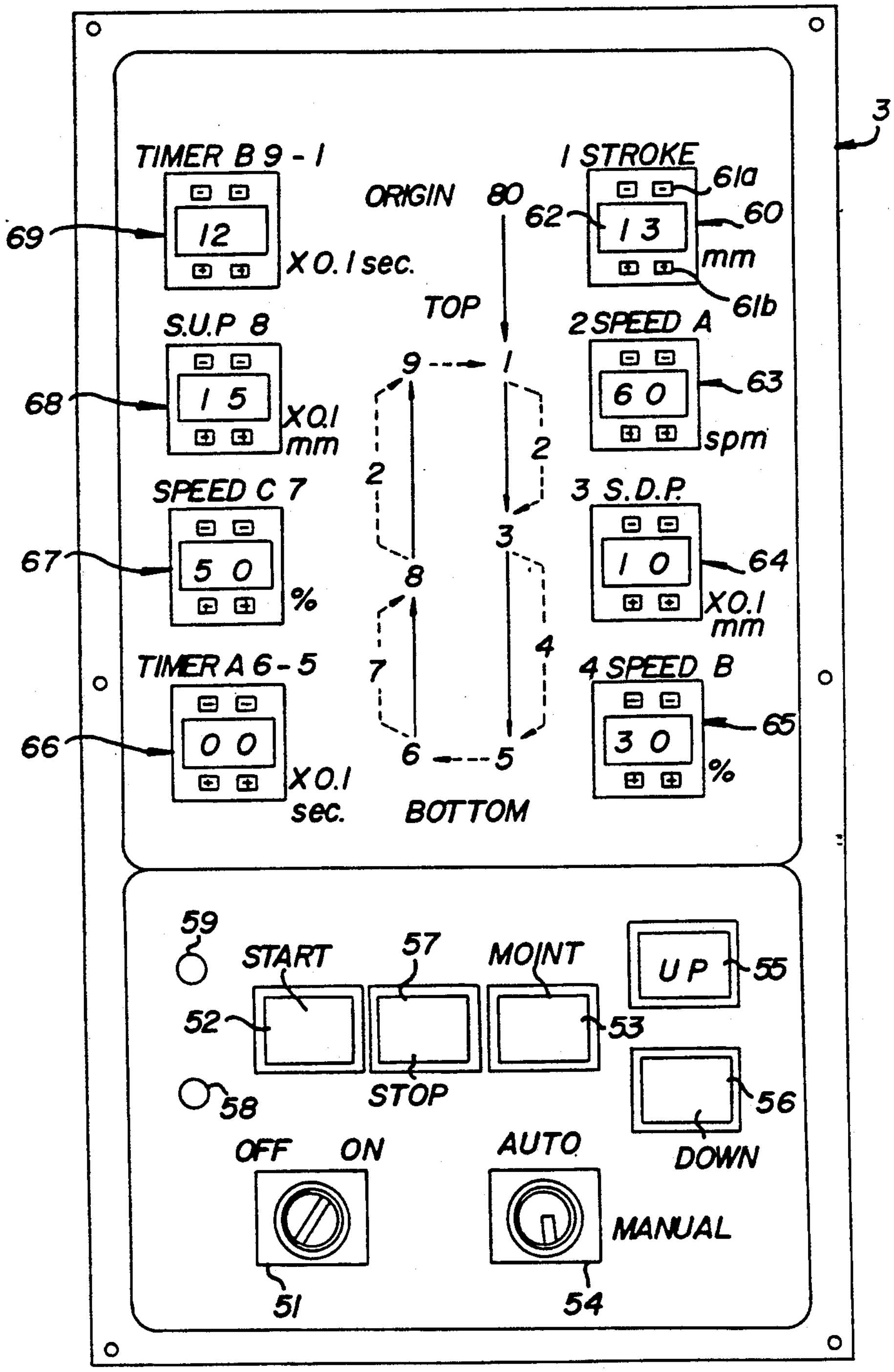
FIG. 3 shows a control-and-display panel of the servo controller according to the present invention.

FIG. 3 shows the control-and-display panel 3 in detail. A power supply switch 51 is a on/off switch for controlling the supply of electric current to the servo controller 4 and the servomotor 20. A start switch 52 is actuated to start an automatic operation (described later) of the servo controller 4. A motor initial switch 53 actuates the servo controller 4 to perform an initial operation. An auto/manual switch 54 is a change-over switch for selecting either an automatic operation or a manufal operation.

An "UP" switch 55 is a switch for activating the ram 36 to move upward in a manual operation. A "DOWN" switch 56 is a switch for activating the ram 36 to move downward in a manual operation. A stop switch 57 is a switch for suspending the press machine 1 when continuously operating under program control (described later). A motor power supply monitor LED 58 is a monitor which turns ON when the press machine 1 is OFF-line, that is, when the press machine 1 is not electrically interlocked with another machine, and a servomotor power supply unit 110 is ON. A press auto-operation permit LED 59 is a monitor arranged such that the LED turns ON when the press machine 1 is OFF-line and in a start permit state.

The functions of switches disposed on the upper part of the control and display panel 3 will next be explained. These switches are used to set a motion of the ram 36. The stroke setting switch 60 is actuated to set a range within which the ram 36 is movable, that is, a length of movement of the ram 36. The switch 60 has a display section 62 for numerically displaying a set distance, that is, a length. A negative stepping switch 61*a* for decrement is provided at the upper side of the display section 62 in correspondence with one digit displayed therein. The negative stepping switch 61*a* is arranged such that, every time it is pressed, the corresponding numeral displayed in the display section 62 is decremented by a minimum unit.

A positive stepping switch 61*b* which is provided at the lower side of the display section 62 is arranged such that, every time it is pressed, the corresponding displayed numeral is incremented in reverse to the above. In this embodiment, the stroke setting switch 60 enables a stroke to be set in units of 1 mm (minimum step) within a range of from 1 to 29 mm. From the viewpoint of the mechanism, tile ram 36 is capable of moving through 80 mm; however, it suffices to use only part of it as a stroke in a press operation. Accordingly, there is no waste in the press operation. It should be noted that numerals which are specified in this embodiment are only references for assistance of understanding of this embodiment and in no way restrict the present invention.

All the switches 63, 64, 65, 66, 67, 68 and 69 described hereinunder have the same function and structure as those of the above-described stroke setting switch 60 and are different from each other only in terms of steps and units of data which are to be set thereby. The speed A setting switch 63 is used to set an operation speed of the ram 36 of the press. The speed A is a set number of revolutions of the servomotor 20 for controlling the same. In this embodiment, the speed A can be set in step units of 10 rpm within a range of from 10 rpm to 90 rpm. The slow-down start point (S.D.P) setting switch 64 is used to set a position at which the ram 36 reduces its descending speed before performing a working operation, which is one of the significant features of the present invention. This set value represents a distance from the bottom dead point of the ram 36. In this embodiment, the set value can be set in a step of 0.5 mm within a range of from 0 mm to 9.5 mm.

If the S.D.P setting switch 64 is set to 0 mm, the ram 36 moves to the bottom dead point without slowing down. The speed B setting switch 65 is used to set descending speed of the ram 36 from a position set with the S.D.P setting switch 64. The speed B is set in terms of percentage with respect to a value set through the speed A setting switch 63. In this embodiment, the speed B is set in a step of 10% within a range of from 10% to 100%. The timer B setting switch 66 is a switch used to set a suspension period during which the ram 36 is at rest at the bottom dead point thereof.

In this embodiment, the suspension period can be set in a step of 0.1 sec within a range of from 0 sec to 9.9 sec. The preferable suspension period itself is about 0.05–2 seconds. The speed C setting switch 67 is used to set an ascending speed of the ram 36. In this embodiment, the speed C can be set in a step of 10% within a range of from 10 to 100% with respect to a set value for the speed A. The slow-up start point (S.U.P) setting switch 68 is used to set a distance from the bottom dead point of the ram 36. Up to this set point, the ram 36 moves upward at a speed set with the speed C setting switch 67.

The timer B setting switch 69 is a switch used to set a suspension period during which the ram 39 is at rest at the top dead point thereof. In this embodiment, the suspension period can be set in a step of 0.1 sec within a range of from 0 sec to 9.9 sec.

Figure 4:
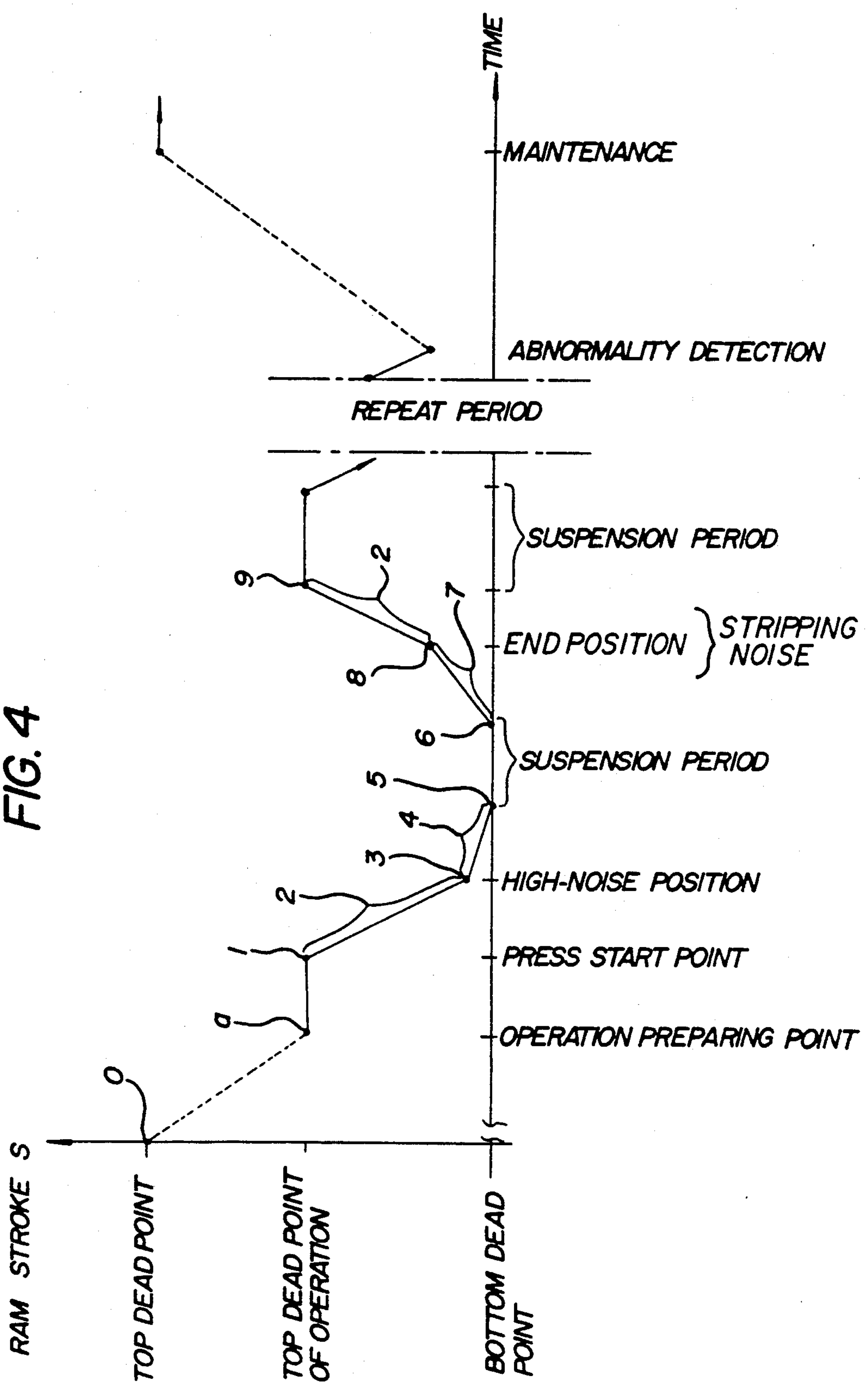
FIG. 4 is a graph showing the locus of movement of the ram.

The graph in FIG. 4 shows the motion of the ram 36 of the press machine having both suspension speed and slow working speed. The abscissa axis represents the time t, while the ordinate axis represents the ram stroke S of the ram 36. The motion of the ram 36 will be described hereinunder with reference to FIG. 4. Initially, the ram 36 is at the position (origin 0) of the top dead point which is determined by the mechanical mechanism shown in FIG. 2. This position is where a tool is secured to the distal end of the ram 36 or a preparatory operation is conducted. This position is detected by means of a sensor 70 (see FIG. 6) described later.

When the press machine 1 is activated, the ram 36 moves from the position of the origin 0 to an operation preparing point a which is the top dead point of the operation. The operation preparing point a is an extremity point of travel of the ram 36 in operation, that is, the top dead point of the press operation. If the above-described start switch 52 is pressed when the ram 36 is at the operation preparing point a, the ram 36 starts its pressing motion, that is, it starts the movement from the press start point 1 to the high-noise position 3. During the interval 2 of movement from the press start point 1 to the high-noise position ', the ram 36 moves at a high speed set with the speed A setting switch 63. Next, the ram 36 moves from the high-noise position 3 to the stop position 5, that is, the bottom dead point. This operation is optional.

The slow speed of the working operation 4 this period is set by the speed B setting switch 65, and the ram 36 moves at the set speed B. In general, the speed B is set so as to be lower than the set speed A. Since the speed at which the ram 36 strikes against a workpiece is reduced to about ⅓ (variable P) and preferably about 1.5 m/s, the noise is extremely reduced. The ram 36 is at rest at the bottom dead point thereof during the interval from the stop position 5 to the stop position 6. This suspension period is set with the timer A setting switch 66 and is preferably about 0.05–2 seconds. Next, the ram 36 moves upward from the stop position 6 to the end position 8.

The ascending speed during this period is set with the speed C setting switch 67. The end position 8 is set in terms of the distance from the bottom dead point of the ram 36 with the S.U.P setting switch 68. The speed of movement from the end position 8 to the stop position 9 is the same as the speed of movement in the interval 2 of movement. The stop position 9 is the same as the operation preparing point a from the viewpoint of the position of the ram 36. The same motion as the above is repeated from the operation preparing point a. Upon completion of all of the operation, the press machine 1 returns to the origin 0 determined by the mechanism of the press machine 1.

Figure 5:
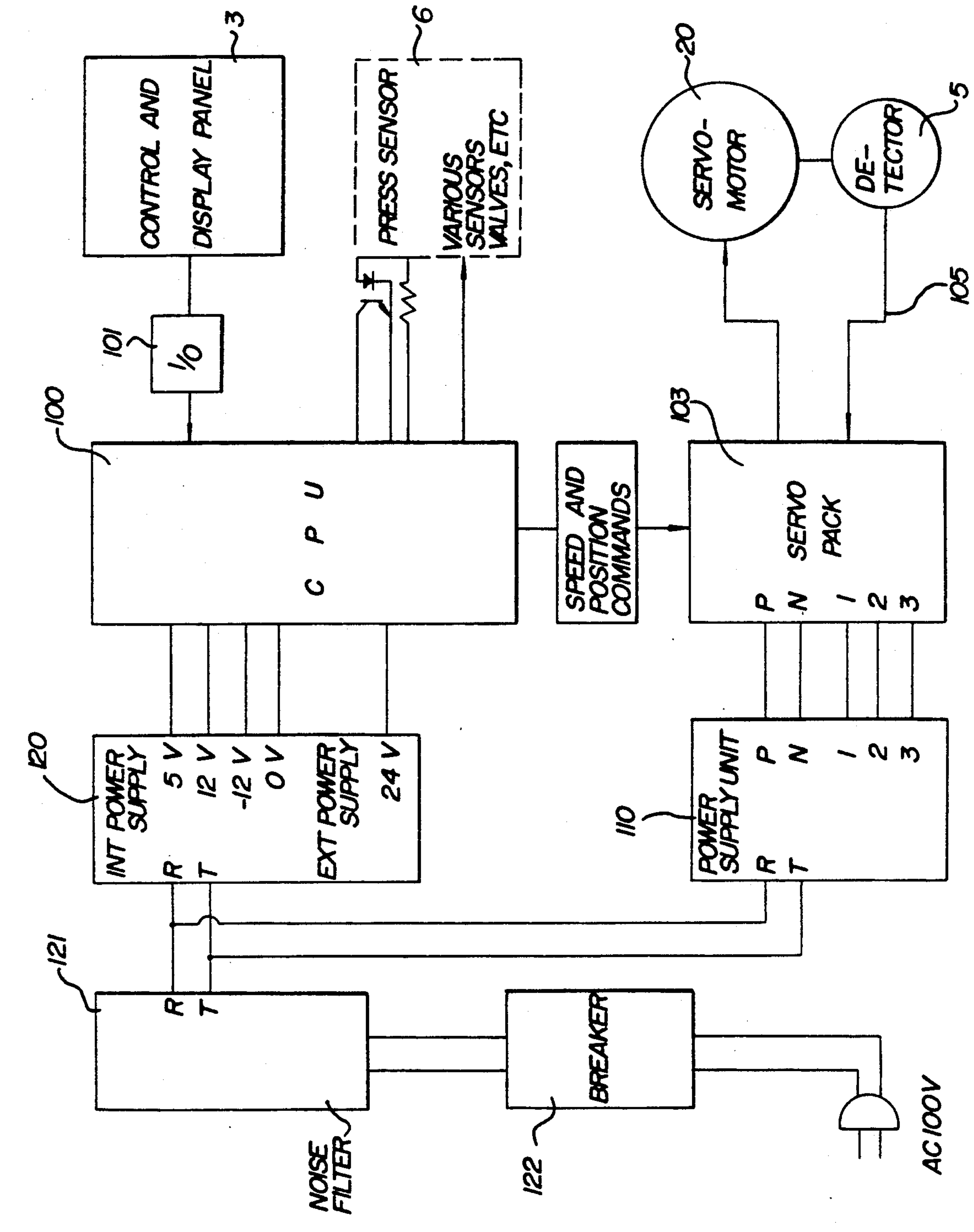
FIG. 5 is a functional block diagram showing in detail the servo controller according to the present invention.

FIG. 5 is a functional block diagram showing in detail the controller 4 in FIG. 1. A CPU 100 is a 16-bit central processing unit which generally controls the servo controller 4. The CPU 100 receives through an input/output unit 101 commands concerning the motion of the ram 36 given from the control and display panel 3. The CPU 100 transmits speed and position commands from the control and display panel 3 to a servo pack 103.

The servo pack 103, which is arranged to store patterns of motion of the ram 36 in advance, comprises a memory for storing a program and working data, a central processing circuit (CPU) and an amplifier circuit for supplying electric power to the servomotor. The servo pack 103 is commercially available by a variety of names and its structure and function are known; therefore, detailed description thereof is omitted. In response to a command, the servo pack 103 delivers an output to the servomotor 20. Receiving this output, the servomotor 20 rotates.

As the servomotor 20 starts to rotate, the detector 5 provided on the output shaft of the servomotor 20 outputs the rotation of the servomotor 20 in the form of an electrical digital signal 105. In this embodiment, the detector 5 is an optical encoder. However, the detector 5 is not necessarily limited thereto, and it is possible to employ any type of detector, for example, an induction or magnetic-type detector, provided that it is designed to detect rotation. A power supply unit 110 is defined by a power transformer or the like for supplying electric power to the servomotor 20. A power supply circuit 120 which comprises a transformer, a rectifier circuit and so forth is supplied with an AC power supply to generate direct currents for driving the CPU 100 and a power supply for the output of the CPU 100. In this embodiment, the power supply circuit 120 generates necessary direct currents on the basis of an AC power supply of 100 V.

In this embodiment, the power supply circuit 120 generates DC voltages of 5 V, 12 V and −12 V from an AC voltage of 100 V. The AC power supply is input to the power supply circuit 120 through a breaker 122 and a noise filter 121. The breaker 122 is employed to cut off an overcurrent or the input power supply when not used. The noise filter 121 is an electrical filter for cutting off an electrical noise which may be input through the power supply. These various elements have heretofore been known.

Figure 6:
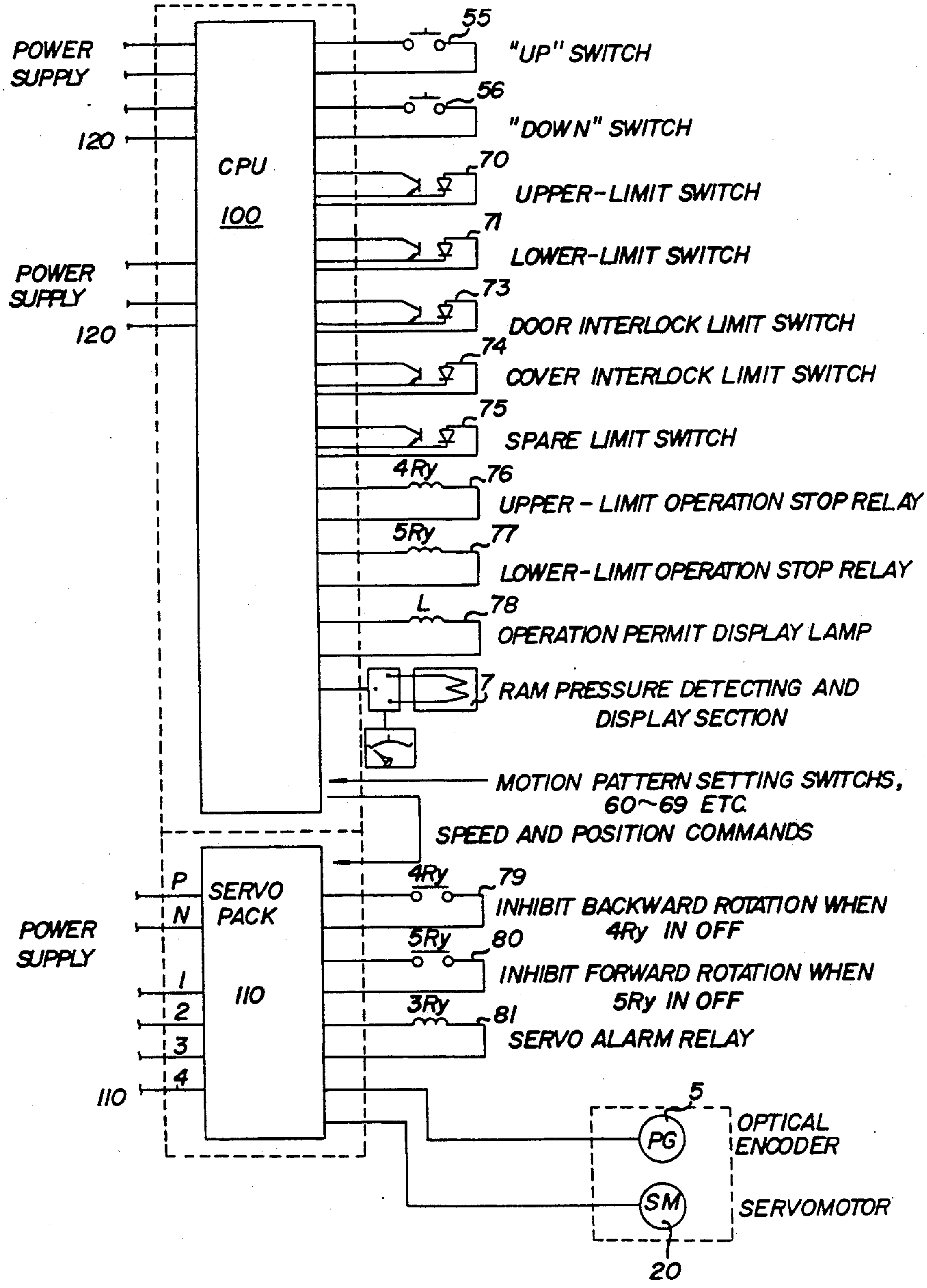
FIG. 6 shows signals which are input to and output from the servo controller.

FIG. 6 schematically shows signals input to the CPU 100 and the servo pack 110. The CPU 110 is supplied as inputs thereof with signals from the "UP" and "DOWN" switches 55 and 56 used to move upward and downward, respectively, the ram in the manual mode. An upper-limit switch 70 and a lower-limit switch 71 are provided at the upper- and lower-limit positions, respectively, which are determined by the mechanism of the press machine 1. The upper-limit switch 70 indicates the above-described origin 0.

In addition, a door interlock limit switch 73, a cover interlock limit switch 74 and a spare limit switch which are interlocked with a door, cover and so forth (not shown) to ensure operator's safety are provided on the door, cover, etc. Further, in order to suspend the ram 36 at the above-described upper- and lower-limit positions determined by the mechanism, it is necessary to suspend the servomotor 20. Relays for this purpose are provided as being an upper-limit operation stop relay 76 and a lower-limit operation stop relay 77. An operation permit display lamp 78 is a display device for indicating that the press machine 1 can be operated.

A ram pressure display section 7 is provided, for example, on the upper part of the frame of the press machine 1 for detecting the pressure applied by the ram 36. The section 7 comprises a strain detecting section, a converter for converting a strain into an electric signal and outputting a voltage corresponding to the amount of strain, and a pressure display section. This output value is employed to detect an abnormality in the pressure applied by the ram 36. The strain detecting section is attached to the upper surface of the frame 10 (see FIG. 2). To the servo pack 110 are electrically connected a backward rotation preventing relay 79, a forward rotation preventing relay 80 and an alarm relay 81.

Figure 7:
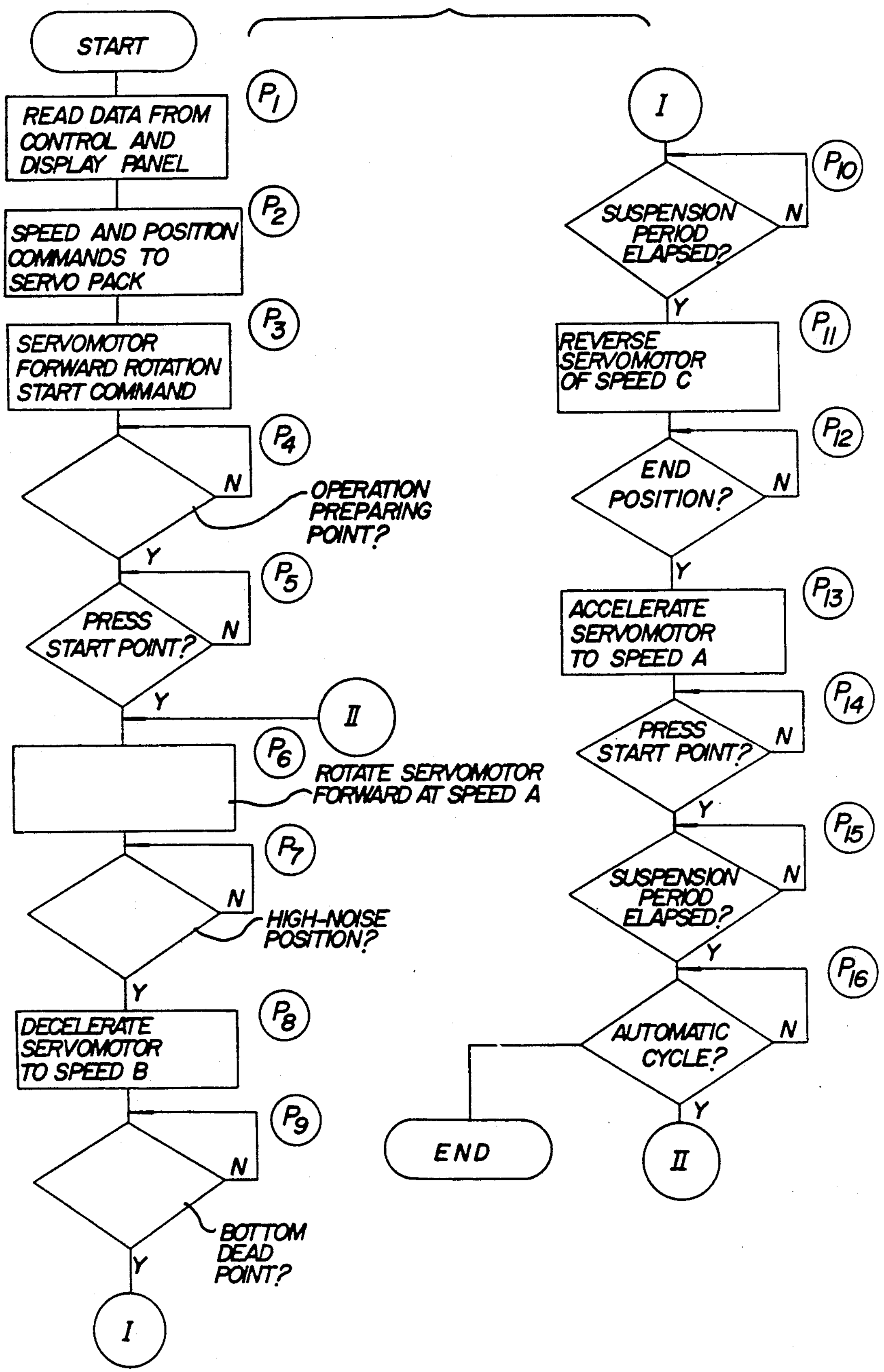
FIG. 7 is a flowchart showing the operation of the servo controller according to the present invention.

The operations of the press machine 1 and the servo controller 4 will be described hereinunder. FIG. 7 shows a flowchart for executing the servo controller 4. The operations of the servo controller 4 and the press machine 1 will be explained with reference to this flowchart. It should be noted that $P_1$ to $P_{16}$ in the Figure denote Steps, respectively, in the flowchart. The operator turns ON the power supply switch 51 on the control and display panel 3. Then, the push-button switch constituting the motor initial switch 53 is pressed to effect initial setting of the servo controller 4, that is, execute an initial operation.

The stroke setting switch 60, the speed A setting switch 63, the S.D.P setting switch 64, the speed B setting switch 65, the timer A setting switch 66, the speed C setting switch 67, the S.U.P setting switch 68 and the timer B setting switch 69, which are on the control and display panel 3, are actuated to input data according to the respective functions of these switches shown in FIG. 4.

As the button of the start switch 52 is pressed, the CPU 100 reads command data set through each of the switches 60, 63, 65, 66, 67, 68 and 69 on the control and display panel 3 according to a built-in program. The data is transferred to the servo pack 103 through the CPU 100 in Step $P_2$. The speed and position data transferred to the servo pack 103 is stored in the memory inside the servo pack 103.

The servo pack 103 issues a forward rotation start command to the servomotor 20 according to a program previously stored in the servo pack 103 (Step $P_3$). The rotation of the servomotor 20 causes the worm 21, the worm wheel 23 and the crankshaft 24 to rotate in the mentioned order. The rotation of the crankshaft 24 in the direction of the arrow B causes the crank pin 25 to reciprocate so as to pull the connection 30 in the direction of the arrow B. The connection 30 pulls the shaft 31, thus causing the upper and lower arms 32 and 34 to stretch. In consequence, the ram 36 extends downward.

The ram 36 suspends at the operation preparing point a (Step $P_4$), and after a predetermined suspension period, it starts a press operation (Steps $P_5$ and $P_6$). The speed during this period has already been set through the speed A setting switch 63. In the meantime, the output signal 105 from the detector 104 provided on the output shaft of the servomotor 20 is continuously fed back to the servo pack 103. The present position of the ram 36 is presumed on the basis of the feedback signal.

When it is detected by counting the feedback signal that the ram 36 has reached the high-noise position 3 (Step $P_7$), the program in the servo pack 103 causes the speed of rotation of the servomotor 20 to be switched to a speed set through the speed B setting switch 65 in Step $P_8$. More specifically, the speed of rotation of the servomotor 20 is reduced to a predetermined proportion with respect to the value set through the speed A setting switch 63. This is a region in which the highest noise is generated in the conventional press machine.

This is because the tool attached to the distal end of the ram applies an impact to the workpiece and at this moment the workpiece, the tool, etc. cause vibrations. Assuming that the stroke determined by the mechanism is S, the value set through the speed A setting switch is V, the value set through the stroke setting switch 60 is $S_1$, the value set through the S.D.P. setting switch 64 is $S_2$ and the value set through the speed B setting switch 65 is $V_1$, then the working speed of the conventional press machine is $t=S/V$, whereas that of the present invention is $t_2=(S_1-S_2/V+S_2/V_1$.

The example of this slow working speed is as follows.

In this embodiment, the ram 36 can be stroked in a range of about 10 cycle per minute and about 120 cycle per minute.

If the stroke setting switch 60 is set 29 mm, the speed A setting switch 63 is set 90 rpm and the speed B setting switch 65 is set 30%, the ram 36 moves to the high-noise position 3 at the maximum velocity of about 15 m per minute (an approaching first speed in claim 1). But, at the high-noise position of 3 , the speed of the ram 36 is decreased to a slow speed set by the speed B setting switch 63, that is, a velocity of about 1.5 m per minute.

The speed B, that is, the slow working speed can be set by a step of 10% within a range of 10% and 100%. If the speed B setting switch 65 is set 10%, the velocity of ram 36 can be decreased less than 1.5 m per minute. The velocity of ram 36 can be considerably reduced by about 1/10 under the set of 30% of the Speed B setting switch 65 by knuckle joint and the crank mechanism.

A comparison between a case where the amounts set through the above-described setting switches 60, 63, 64, 65, 66, 67, 68 and 69 are assumed to be 13 mm ($S_1$), 60 rpm (V), 1.0 mm ($S_2$), 30% ($V_1$), 00 sec, 50%, 1.5 mm and 0.1 sec, respectively, and a case where a working operation was conducted with a conventional oil hydraulic press machine at a uniform speed over the entire stroke, i.e., 80 mm (S). If the other conditions are the same, the total working time is reduced to about 1/5 of that in the case of the prior art. Due to the suspension period, there was no damages to the worked products since the tool is smoothly separated from the workpiece. The noise was also reduced by a large margin and the working efficiency was improved.

When the ram 36 is judged to be at the bottom dead point in Step $P_9$, it is then judged whether or not a suspension period has already been set through the timer B setting switch 66. If YES, the ram 36 suspends in Step $P_{10}$. When the suspension period has elapsed, the ram 36 then moves upward at a speed set through the speed C setting switch 67 (Step $P_{11}$) The upward movement of the ram 36 is effected by reversing the servomotor 20.

More specifically, since the servomotor 20 is reversed as described above, the entire stroke (as viewed in terms of the mechanism) of the press machine 1 is not used. However, it should be noted that the use of the entire stroke as viewed in the mechanism does not depart from the present invention. The ascending speed is generally set to a relatively low speed. This is because the workpiece or cuttings may be vacuum-attached to the tool secured to the distal end of the ram 36 and it is therefore necessary to give a sufficient time for the attached workpiece or cuttings to separate therefrom.

If it is urged in Step $P_{12}$ that the ram 36 is at the end position 8 , the ram 36 moves upward at a speed set through the speed A setting switch 63 (Step $P_{13}$). It is judged in Step $P_{14}$ whether or not the ram 36 has reached the start position. Next, it is judged in Step $P_{15}$ whether or not the time set through the timer B setting switch 69 has elapsed. If no time has been set, a subsequent cycle similar to the above is immediately started if the automatic cycle has been set (Step $P_{16}$). The judgement as to whether not the automatic cycle has been set is made on the basis of the position of the auto/manual switch 54.

Figure 8:
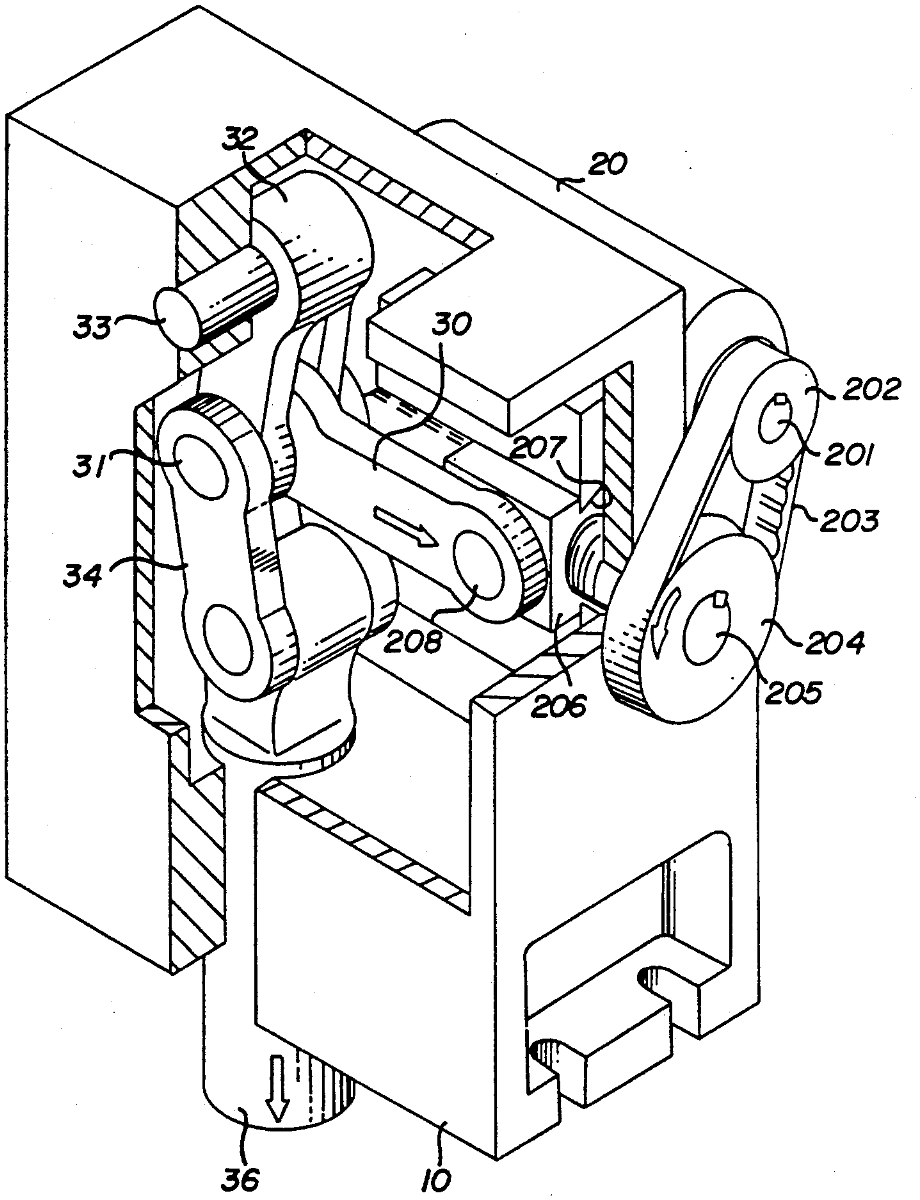
FIG. 8 shows another embodiment of the press machine.

FIG. 8 shows a second embodiment in which a screw driving mechanism is employed for the press machine disclosed in FIG. 2. The members which are common with the embodiment shown in FIG. 2 are denoted by the same reference numerals. A pulley 202 is keyed to an output shaft 201 of the servomotor 20. The pulley 202 is engaged with a timing belt 203. The timing belt 203 is, in turn, engaged with a pulley 204. A feed screw 205 is keyed to the pulley 204.

The feed screw 205 is rotatably supported by the frame 10 through a bearing (not shown). The feed screw 205 is in thread engagement with a slider 206. The slider 206 is slidably provided in a slide guide groove 207 which is defined by a dovetail groove fixed to the frame 10. A pin 208 is secured to the slider 206. The connection 30 is rotatably fitted on the pin 208. The arrangement of the other part of this embodiment is the same as that of the embodiment shown in FIG. 2 and therefore description thereof is omitted.

The output of the servomotor 20 causes the output shaft 201, the pulley 202, the timing belt 203, the pulley 204 and the feed screw 205 to rotate so as to move the slider 206. The movement of the slider 206 causes the pin 208 and the connection 30 to move, thus performing an operation similar to that in the above-described first embodiment.

Figure 9:
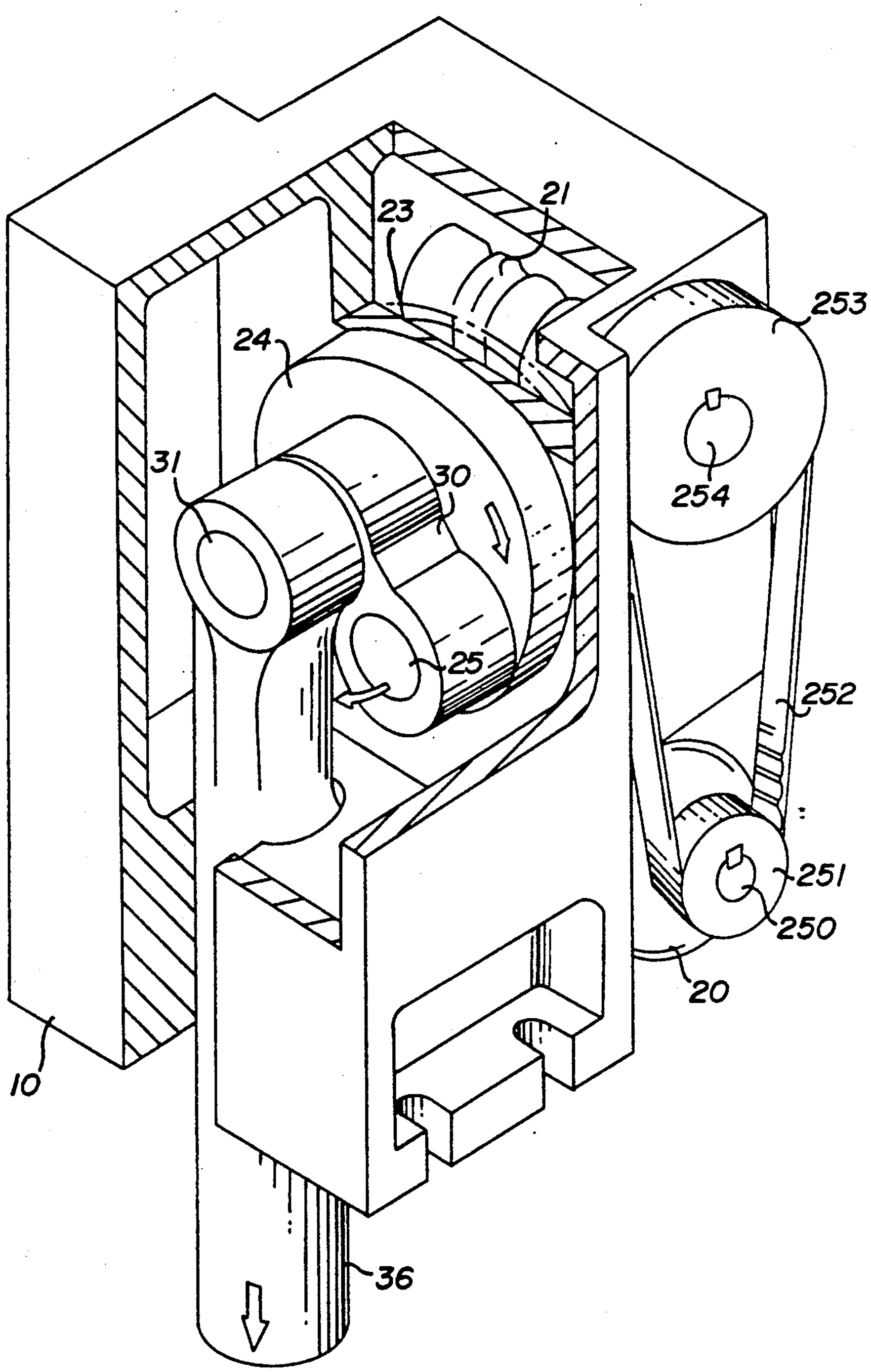
FIG. 9 shows still another embodiment of the press machine.

FIG. 9 shows still another embodiment of the press machine 1 disclosed in FIG. 2. A pulley 251 is keyed to an output shaft 250 of the servomotor 20. The pulley 251 is engaged with a timing belt 252. The timing belt 252 is, in turn, engaged with a pulley 253. A worm shaft 254 is keyed to the pulley 253. A worm 21 is secured to the worm shaft 254, the worm 21 being formed either integral with the worm shaft 254 or separately therefrom.

The worm 21 is meshed with a worm wheel 23. A crankshaft 24 is coaxially provided on the worm wheel 23. A crank pin 25 is secured to the crankshaft 24 at a position which is eccentric with respect to the crankshaft 24. One end of a connection 30 is rotatably provided on the crank pin 25. A shaft 31 is secured to the other end of the connection 30. The upper end of a ram 36 is rotatably provided on the shaft 31. After all, the crankshaft, the crank pin 25, the connection 30, the shaft 31 and the ram 36 form in combination a crank mechanism for converting a rotational motion into a linear motion. The rotational output of the servomotor 20 is transmitted through the output shaft 250, the pulley 251, the timing belt 252, the pulley 253, the worm shaft 254 and the worm 21 to rotate the crankshaft 24. As the crankshaft 24 rotates, the eccentric crank pin 25 revolves around the center of the crankshaft 24. This motion causes the connection 30 to pivot about the crank pin 25. The pivotal motion of the connection 30 activates the ram 36 to move up and down.

Figure 10:
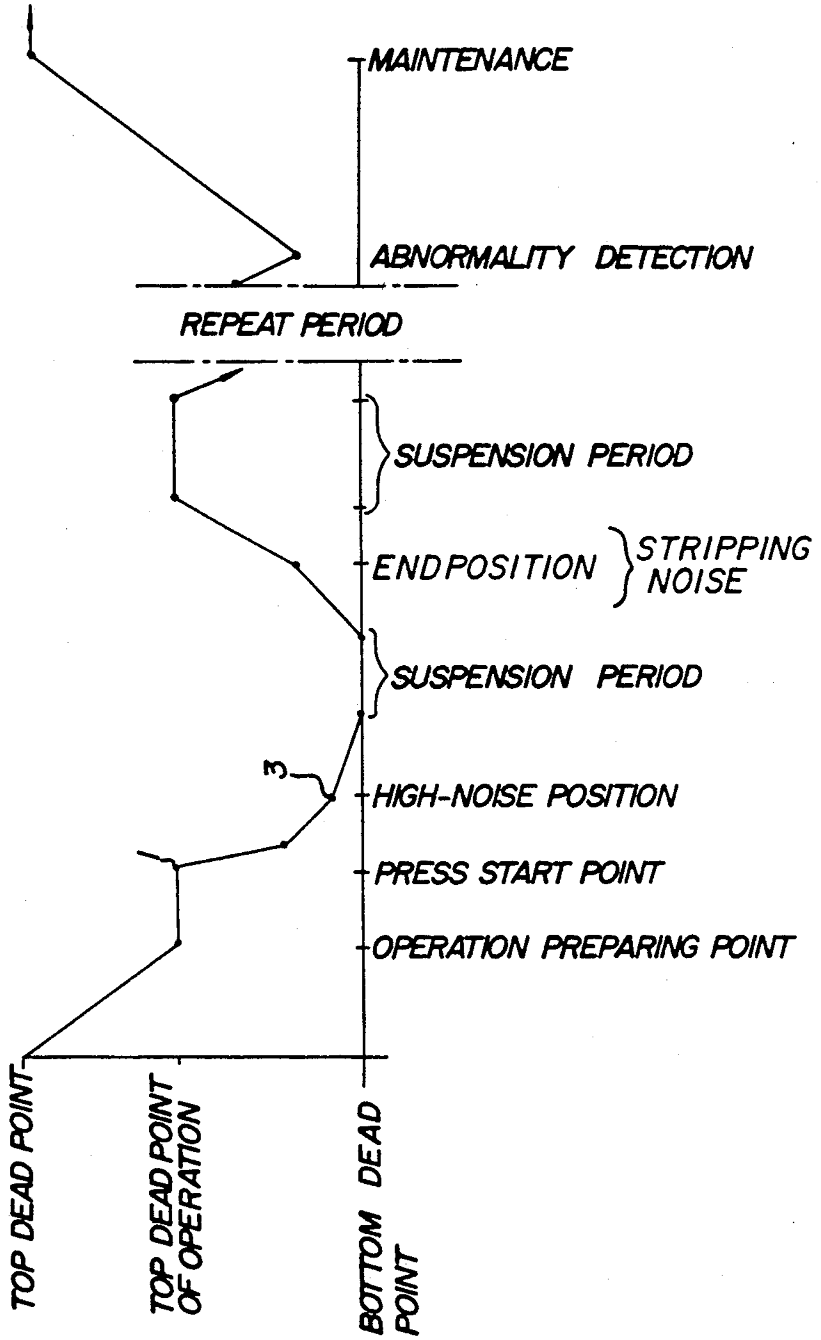
FIGS. 10 and 11 are graphs showing other examples of the locus of movement of the ram.
Figure 11:
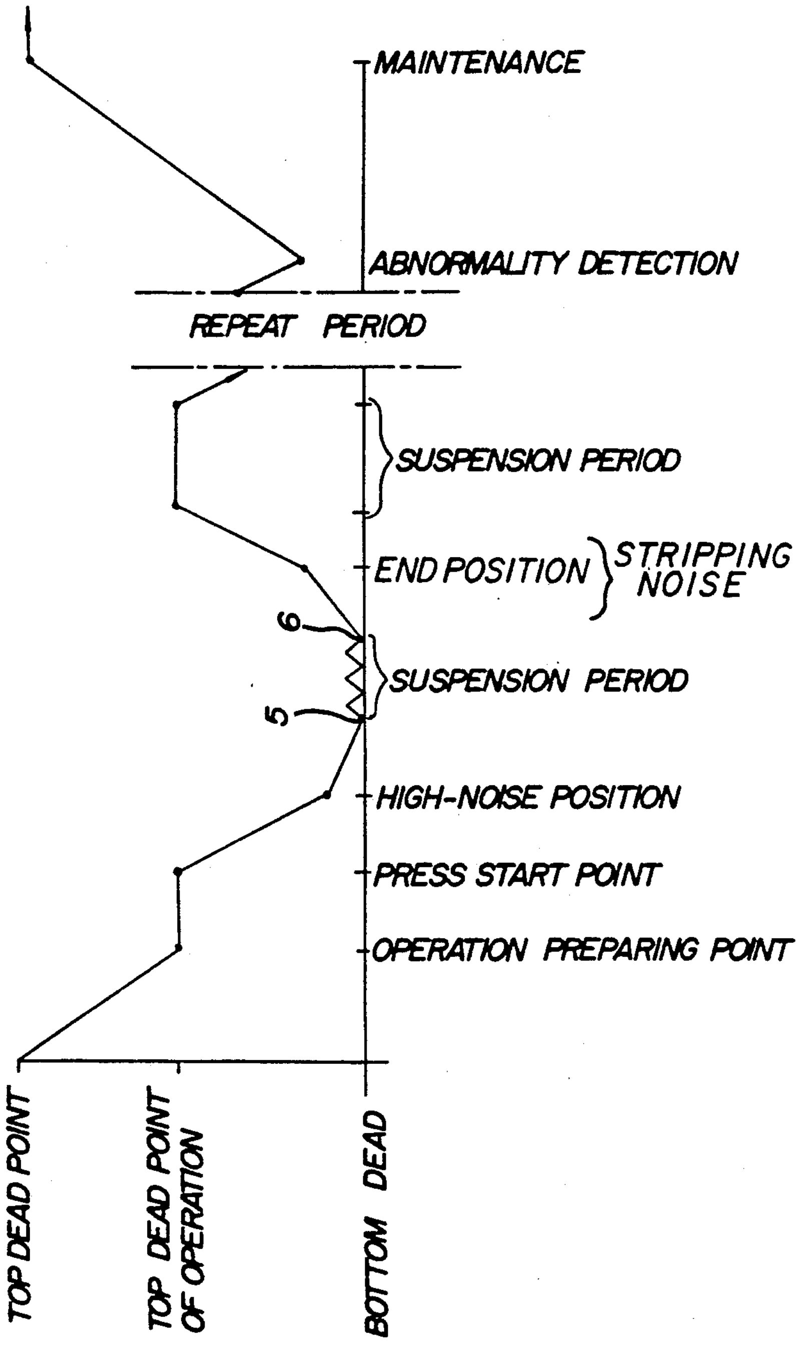

FIG. 10 shows an example in which the speed is changed once during the interval from the press start to the high-noise position so that two different levels of speed are available. FIG. 11 shows an example in which a vertical vibrating operation is effected during the interval from the stop position 5 the stop position 6 so that the tool secured to the distal end of the ram 36 is more smoothly separated from the workpiece.

Strictly speaking, FIG. 4 does not show the motion of the ram 36 but schematically shows the motion of the servomotor 20. Accordingly, to make the ram 36 perform the illustrated motion, it may also be possible to directly detect the motion of the ram 36 and control the servomotor 20 on the basis of the detected value. In this case, it is even more preferable to design the system while taking into consideration the converting characteristics of the mechanism for converting a rotational motion into a linear motion. Thus, it is possible to control strictly the speed and position of the ram 36.

The above-described servo controller 4 electically realizes the motion of the ram 36; however, as will be clear from the foregoing technical idea of the present invention, the motion of the ram 36 may also be realized by a combination of a mechanical mechanism such as a cam, gear or level mechanism and a digital servo controller such as that described above. Such an arrangement does not depart from the spirit of the present invention. Further, the above-described digital servo controller may be replaced by an analog controller, provided that it is capable of driving the ram on the basis of the foregoing idea. These mechanisms may be those which are known in various kinds of industrial machinery such as machine tools and robots.

Industrial Applicability

As described above, the method of operating a press machine and a servo controller therefor according to the present invention may be applied to plastic working using a press machine, such as shearing work, for example, blanking or piercing, bending, deep drawing and compression forming. Although in the foregoing embodiments the present invention is applied to working of pins made from metal sheet for semiconductors, the present invention is applicable to working of various parts such as metallic and non-metallic parts of any kind of industrial machinery, office automation equipment and automobiles.

What is claimed is:

1. A servo controller for a press machine having a frame, a servomotor provided on said frame, a power transmission means for transmitting the rotational driving force of said servomotor, and a reciprocating motion conversion means for converting power received from said power transmission mechanism into a reciprocating motion of a ram holding a tool, said servo controller comprising a control-and-display means comprised of a plurality of switches for determining a locus of motion of said ram by controlling the rotation of said servomotor, a servo control means for controlling the motion of said servomotor, and a central processing means for giving commands to said servo control means based on input commands signals from said control-and-display means in that a tool held by said ram stays substantially still for a period of from 0.05 to 2 seconds immediately after the completion of pressing a workpiece so that an air flows into a space between said tool and said pressed workpiece to separate smoothly thereby preventing said workpiece from being damaged.

2. A servo controller for a press machine according to claim 1, wherein said central processing means gives further command such that a speed of said tool is reduced to around 1.5 meter/second so that said tool does not generate high noise while working on said workpiece.

3. A servo controller for a press machine according to claim 1, wherein said switches are a plurality of switches which is possible to produce various speeds of said ram.

4. A servo controller for a press machine according to claim 2, wherein said servo control means includes a deceleration command means for commanding said tool to be decelerated while working on said workpiece.

5. A servo controller for a press machine according to claim 1, further including a forward-and-backward rotation command means for commanding said servomotor to rotate forwardly and reversely.

6. A servo controller for a press machine according to claim 1, further including a lubricating oil filled inside of said frame to damp noise generated from said power transmission means and said reciprocating motion conversion means positioned within said frame.

* * * * *